United States Patent [19]
Oishi et al.

[11] 4,427,166
[45] Jan. 24, 1984

[54] MAGNETIC TAPE CASSETTE

[75] Inventors: Kengo Oishi; Masayoshi Moriwaki; Choji Komiyama, all of Odawara, Japan

[73] Assignee: Fuji Photo Film Co., Ltd., Kanagawa, Japan

[21] Appl. No.: 224,238

[22] Filed: Jan. 12, 1981

[30] Foreign Application Priority Data

Feb. 6, 1980 [JP] Japan .............................. 55-13885[U]

[51] Int. Cl.³ ........................ G03B 1/04; G11B 15/32; B65H 23/04
[52] U.S. Cl. .................................... 242/199; 242/197; 226/196
[58] Field of Search ................ 242/55.19 A, 192, 194, 242/197-200, 76; 360/93, 96, 132, 71; 226/190-193, 196, 195

[56] References Cited

U.S. PATENT DOCUMENTS

| 1,419,049 | 6/1922 | Harsel et al. | 226/192 X |
| 3,405,855 | 10/1968 | Daly et al. | 226/1 |
| 3,411,731 | 11/1968 | Kelley | 242/199 |
| 3,829,040 | 8/1974 | Nelson | 242/199 |
| 3,843,035 | 10/1974 | Fitterer et al. | 226/195 |
| 3,890,641 | 6/1975 | Mo et al. | 360/71 |
| 4,150,773 | 4/1979 | Fell et al. | 226/196 |

OTHER PUBLICATIONS

IBM Technical Disclosure Bulletin, vol. 14, No. 3, Aug. 1971, pp. 677 "Capstan Surface Grooves to Improve Tape Guidance" J. W. Lewis & H. Ottesen.

Primary Examiner—Leonard D. Christian
Attorney, Agent, or Firm—Sughrue, Mion, Zinn, Macpeak, and Seas

[57] ABSTRACT

A magnetic tape cassette for either video or audio tapes in which creasing of the tape during high speed running is prevented. Tape guide members are provided having grooves in the circumferential surface thereof. The grooves can be provided by cutting or molding them into a rod-shaped member or by a tightly wound wire. The guide member can be either mounted in a fixed position or rotatably between the two cassette casing halves.

9 Claims, 6 Drawing Figures

MAGNETIC TAPE CASSETTE

BACKGROUND OF THE INVENTION

The present invention relates to a magnetic tape cassette, and more particularly to a magnetic tape cassette having an improved tape guide member for defining a tape travel path in the tape cassette.

Recently, in tape cassettes for both audio and video applications, the thickness of the tape has been decreased to provide for miniaturization, a decrease in weight and long tape lengths for increased recording and playing times. Conventionally, the tape guide structure for guiding such a thin tape in general includes a metal or plastic pin or a roller on the surface of which the tape slides. When necessary, a pair of flanges is provided at the ends of the pin or roller so as to prevent the travelling tape from displacing in the widthwise direction.

However, particular operational modes in which the travelling speed of the tape in the tape cassette is high, such as fast forward, fast reverse and double speed play or record, can damage such a thin tape. Particularly, creases are likely to form which leads to instability during playing of the tape. In the worst case, it is impossible as a practical matter to control the running of the magnetic tape so that winding problems and jamming occur.

The inventors of the present invention have discovered that such problems are caused by variations in contact direction and contact area of the magnetic tape with respect to the pins and rollers and that, when the tape is fed at a high speed, an air layer is formed which results in a slight floating of the magnetic tape in the contact region causing it to deviate from a predetermined tape travelling path.

It is thus an object of the invention to provide a tape cassette in which the above-noted defects have been eliminated.

SUMMARY OF THE INVENTION

These and other objects of the present invention have been attained with a magnetic tape cassette in which a pair of hubs are rotatably disposed in the hollow space defined by a pair of cassette casing halves, the magnetic tape wound on the hubs is fed from either of the hubs for recording and reproducting, and narrow grooves which are parallel to the direction of travel of the tape or helical with respect to the circumferential direction in the tape travel path between the hubs are formed in the support or contact surface of the guide structure.

Specifically, the grooves run in a direction having a component in a direction of travel of the tape. That is, the grooves either extend in a direction parallel to the direction of the travel of the tape or they run at an acute angle to the direction of the travel of the tape with the acute angle being either positive or negative or positive on one side of the center line of the tape and negative on the other side of the center line of the tape with respect to its direction of travel. The grooves can either be formed by constructing them integrally with the tape guide means such as cutting or molding them into a rod-shaped member, or they can be provided by a tightly helical wound wire. The wire can be mounted in a fixed position or can be mounted so as to rotate.

DESCRIPTION OF THE PREFERRED EMBODIMENTS

Preferred embodiments of a magnetic tape cassette according to the present invention will now be described with reference to the accompanying drawings.

Figure 1:
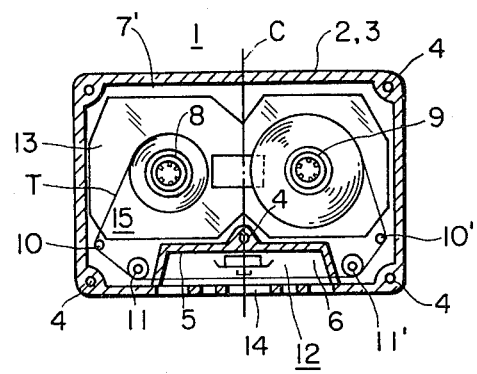
FIG. 1 is a sectional plan view showing an inner mechanism of a tape cassette according to the present invention.

FIG. 1 is a sectional plan view a so-called Philips type compact audio tape cassette including tape guide members constructed according to the invention.

In FIG. 1, upper and lower cassette casing halves 2 and 3 of a tape cassette 1 are coupled to each other by attachment members 4 such as screws. An inner hollow space between the cassette halves is divided by partitioning walls 5 extending from inner surfaces of the cassette halves into a recording and playback section 6 and a hub receiving section 7. A pair of hubs 8 and 9, rotary guide rollers 11 and 11' having flanges and tape guide members 10 and 10' are disposed in the hub receiving section substantially symmetrically with respect to the center line C. A friction sheet 13 is disposed between each of the inner surfaces of the cassette halves 2 and 3 and each end wall of the hubs 8 and 9. In the recording and playback section 6 is disposed a pressing member 12 which presses against a magnetic tape T on the non-magnetic surface thereof. Magnetic heads, capstans and the like can extend into the cassette from the outside through a plurality of openings 14 formed in front walls of the cassette halves 2 and 3.

The magnetic tape T, one end of which is wound on the hub 8 and the other end of which is wound on the other hub 9, is transferred in either direction between the hubs 8 and 9 for recording or playback along the tape travel path defined by the tape guide members 10 and 10', flange rotary guide rollers 11 and 11', and the pressing member 12.

Figure 2:
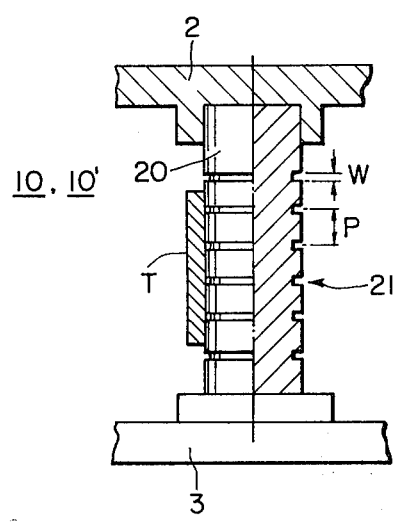
FIG. 2 is an enlarged, in part cross-sectional, side view showing a primary portion of a tape cassette according to the present invention.

FIG. 2 is an enlarged view of the tape guide member 10 or 10' which is a primary part of the invention. The tape members 10 and 10' include a cylindrical rod-shaped pin 20 made of plastic with each end of the pin 20 being fixedly secured to a corresponding one of the cassette halves 2 and 3. A plurality of thin grooves 21 having a width W of approximately 0.05 to 1.0 mm, a depth D of 1/10W to 3W, and a pitch P of 1W to 3W are formed in the outer circumferential surface of the pin 20 against which the tape T contacts. The grooves are parallel to each other, extending circumferentially.

When the magnetic tape T travels on and along the circumferential surface in which the grooves are formed, most of air entrained by the travelling tape is introduced into the narrow grooves 21 and passes therethrough without the formation of an air layer between the magnetic tape T and the supporting surface of the pin 20. Moreover, the magnetic tape T supported on the circumferential surface of the pin 20 in which the corresponding area of the circumferential surface to the grooves does not contact against the tape is transferred without a high frictional force being imposed thereon by the pin 20.

If the width W, depth D and groove pitch P are suitably selected from the ranges specified above in compliance with the rigidity, tension, speed, width and the like of the magnetic tape T, the edge of the tape will not enter the grooves and cause crease generation therein and no remarkable creases will be generated along the grooves. It is, however, necessary to remove undesirable plastic projections formed during groove formation in the manufacturing process. The above-described pin 20 may be made of metal or plastic as desired.

Figure 3:
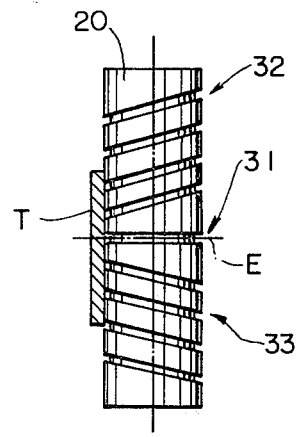
FIGS. 3 to 6 show various alternate embodiments of a guide pin structure according to the present invention.

FIG. 3 shows a modification of grooves formed in the pin 20. A pair of narrow grooves 32 and 33 shown in FIG. 3 are formed helically and extending in different directions upward and downward on either side of a central groove 31 which in parallel to the tape travelling direction and is most closely adjacent the center longitudinal axis of the tape. With the provision of the two spiral grooves 32 and 33, any displacement of the magnetic tape T in the widthwise direction is automatically corrected for and a uniform tension in the widthwise direction is always applied to the tape. If desired, the central groove 31 may be dispensed with and only the helical grooves 32 and 33 provided.

It is possible to rotatably mount the pin 20 shown in FIG. 2 or 3 as is the case of the rotary guide members 11 and 11'. If this is done, it is required that the narrow grooves be formed in the overall circumference of the pin.

Figure 4:
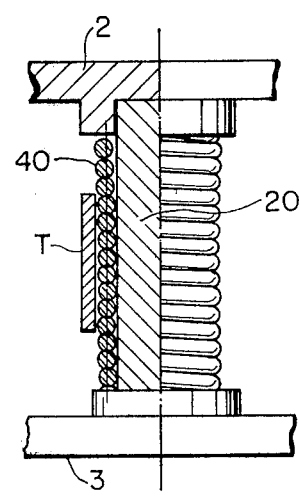

FIG. 4 shows another modification of the pin 20. Instead of the grooves 21, 31, 32 and 33 formed in the outer circumferential surface of the pin 20, a wire 40 having a diameter of 0.05 to 1.0 mm and made, for example, of SUS 304 material is tightly helically wound on the outer surface of the pin 20 with a constant winding diameter. If desired, the wire can be provided with a hard chrome plating or a nickel plating to enhance the slidability, corrosion resistance and hardness of the pin.

With this construction, the magnetic tape T is supported in partial contact with outer surfaces of the wire 40 having a circular cross section and wound on the outer surface of the pin 20. As described above, the area is tightly wound to prevent the magnetic tape T from becoming entangled in the gaps between adjacent wire parts and to prevent crease generation thereby enabling the tape to travel smoothly. For wire having the above described dimensions, any practical desired winding angle can be employed. Also, a cylindrical hollow pin instead of a solid pin 20 as described above can be used if desired.

Figure 5:
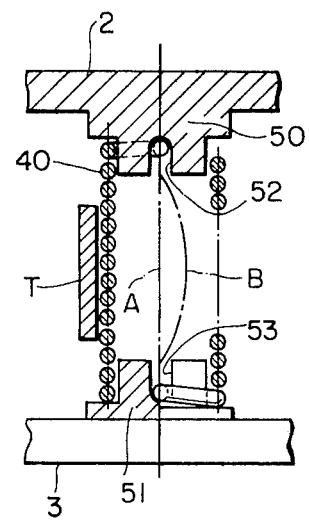

FIG. 5 shows still another embodiment of the invention. In this embodiment, the tightly wound wire is secured at its upper and lower ends to concave portions 52 and 53 of integral projections 50 and 51 formed in the upper and lower inner surfaces of the cassette halves 2 and 3. Since the portion of the wire 40 in contact with the magnetic tape 40 is hollow, when the tension of the magnetic tape is excessively increased, the center line A of the cylindrical wire 40 is, as denoted by B, curved to impart a cushioning effect to the magnetic tape T. Due to this effect, the magnetic tape T will not be cut or creased due to the excessive tension.

Figure 6:
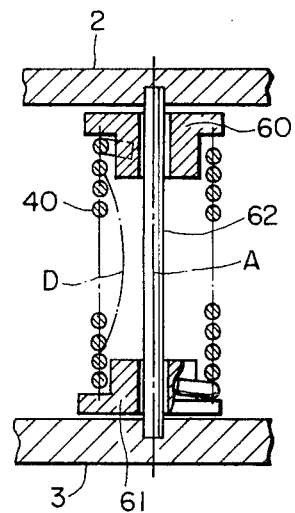

FIG. 6 shows yet another embodiment of the invention. Here, the cylindrically wound wire 40 is made rotatable around its axial center line A by mounting it on bearing members rotatably mounted on the inner surfaces of the upper and lower cassette halves. The bearing members 60 and 61 are rotatably mounted around a fixed shaft 62 so that the cylinder formed by the coil 40 is rotatable between the cassette halves 2 and 3. With this embodiment, if an excessive tension is applied to the magnetic tape which it is in contact with the cylinder of wire 40, the wire 40 will bend and curve as shown by D.

As described above, in a tape cassette constructed according to the invention, narrow grooves are formed in tape contact surface of one or more tape guide members or the tape guide members are made of wire. Accordingly, the tape guide structure is relatively compact and the provision of such guide members does not effect the conventional magnetic tape cassette assembly operations while creasing damage to the tape, which leads to displacement of the tape during its running, is remarkably prevented.

The invention can be applied to video cassettes such as β-Format and VHS cassettes as well as audio cassettes with equally meritorious results.

What is claimed is:

1. A magnetic tape cassette comprising first and second cassette casing halves; a pair of hubs rotatably disposed in a hollow space between said cassette casing halves; magnetic tape wound on said hubs and transferable from either of said hubs for recording and playback to said other hubs; and tape guide means disposed in a tape running path between said hubs and contacting said magnetic tape, said tape guide means comprising a fixed shift having a smooth surface and a wire tightly wound on said fixed shaft defining a substantially non-frictional tape-contacting surface having a groove running in a direction having a component in a direction of travel of said tape.

2. The magnetic tape cassette of claim 1 wherein said grooves extend parallel to said direction of travel of said tape.

3. A magnetic tape cassette comprising first and second cassette casing halves; a pair of hubs rotatably disposed in a hollow space between said cassette casing halves; magnetic tape wound on said hubs and transferable from either of said hubs for recording and playback to said other hubs; and tape guide means disposed in a tape running path between said hubs and contacting said magnetic tape, said tape guide means comprises a cylindrical rod-shaped member having said grooves formed integrally therewith in a circumferential surface thereof, said grooves formed integrally with said rod-shaped member and inclined above a center portion of said tape guide means at a predetermined acute angle with respect to said direction of travel of said tape and inclined at the negative of said predetermined acute angle below said center portion, and a groove is provided in said center portion of said tape guide means extending parallel to said direction of travel of said tape.

4. A magnetic tape cassette comprising first and second cassette casing halves; a pair of hubs rotatably disposed in a hollow space between said cassette casing halves; magnetic tape wound on said hubs and transferable from either of said hubs for recording and playback to said other hubs; and tape guide means disposed in a tape running path between said hubs and contacting said magnetic tape, said first and second cassette casing halves have first and second receiving members respectively, and wherein said tape guide means comprises a tightly bunched spirally wound wire having a constant winding diameter and forming a cylinder defining a non-frictional tape-contacting surface having a groove running in a direction having a component in the direction of travel of said tape, said cylinder being engaged with said first and second receiving members of said first and second cassette casing halves.

5. A magnetic tape cassette comprising first and second cassette casing halves; a pair of hubs rotatably disposed in a hollow space between said cassette casing halves; magnetic tape wound on said hubs and transferable from either of said hubs for recording and playback to said other hubs; andd tape guide means disposed in a tape running path between said hubs and contacting said magnetic tape, said tape guide means comprises a tightly bunched wound wire having a constant winding diameter defining a non-frictional tape contacting surface having a groove running in a direction having a component in the direction of travel of said tape, and wherein first and second bearing means are rotatably mounted on said first and second cassette casing halves, respectively, end portions of said tightly bunched wound wire rigidly engaging said bearing means.

6. The magnetic tape cassette according to claim 5 further comprising a fixed shaft extending between said first and second cassette casing halves, said first and second bearing members being rotatably mounted on said shaft.

7. The magnetic tape cassette of any of claims 1, and 3 wherein the width of said grooves is in a range of 0.05 to 1.0 mm, the depth D of said grooves is in a range of 0.1W to 3W, and have a pitch P in a range of 1W to 3W.

8. The magnetic tape cassette according to any of claims 6, 1, 4 or 5 wherein said wire has a diameter in the range of 0.05 to 1.0 mm.

9. The magnetic tape cassette according to any of claims 6, 1, 4 wherein said wire is provided with a plating of a material selected from the group consisting of chrome and nickel.

* * * * *